Patented Jan. 18, 1938

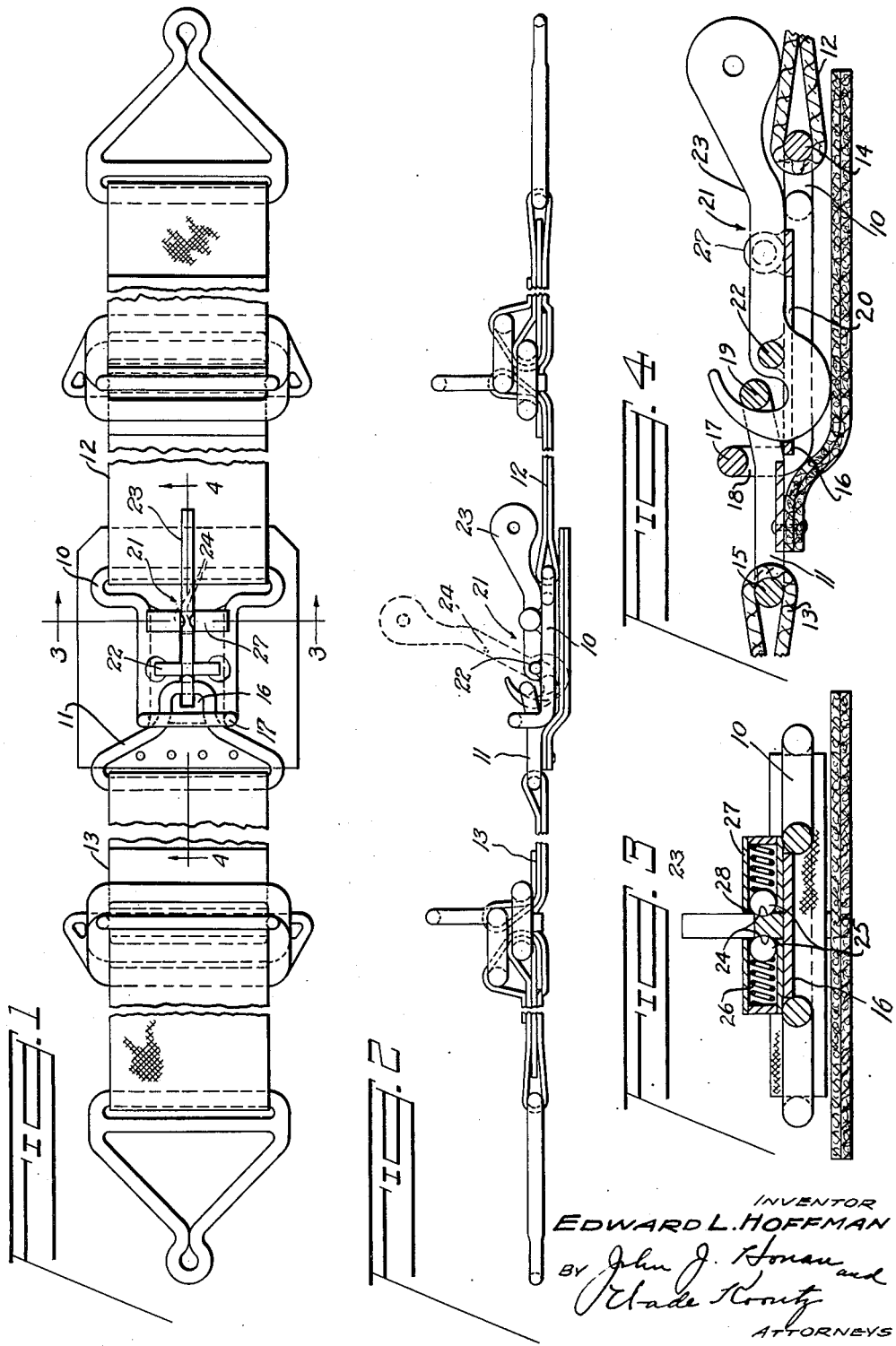

2,105,480

UNITED STATES PATENT OFFICE 2,105,480

SAFETY BELT

Edward L. Hoffman, Montgomery, Ala.

Application February 6, 1937, Serial No. 124,463

9 Claims. (Cl. 227—49)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to safety belts and has particular reference to improved buckles or fastening means for safety belts of the type worn by the pilot or the passengers of an aircraft, while seated, to prevent possible injury to them during sudden maneuvers of the aircraft.

The majority of safety belts as heretofore provided, consisted of a pair of flexible straps or webs anchored at their one ends to the seat or floor of the aircraft and having a quick release buckle for securing the opposite ends of the straps over the laps of the passengers.

The latches or buckles, while being quickly releasable, would remain latched or closed only when the belt was held fairly tight over the lap. These buckles or latches have usually consisted of a pivotally mounted, hook shaped latching member secured to the one end of the belt and adapted to be inserted through a ring or loop member secured to the other end of the belt. When the latching member is folded upon itself after being inserted through the ring or loop, the said ring is normally locked in place by reason of its engagement with the hook end of the latch. The buckle is released by a reverse movement of the latch to enable the ring to slip off the hook. This type of buckle, while being quickly releasable, would remain latched or closed only when the belt was so adjusted over the body of the wearer as to eliminate the possibility of any slack in the belt even though the wearer would from necessity be constantly moving about in the seat of the aircraft.

At other times it would, by reason of its construction, become unlatched, and the desired function of the belt as a medium of assuring safety to the wearer is lost, resulting in liability of injury to the user.

A further disadvantage in safety belts as heretofore provided consisted in the fact that in moving the buckle from a latched to a released position, it was necessary to pull the adjacent ends of the belts or straps toward one another in order to enable the ring to slip off the hook end of the latch. Since the belt, if properly adjusted by the user, must necessarily be fairly taut across the lap of the user to prevent accidental release of the buckle, any physical effort required in pulling the ends of the belt together to effect unlatching, operates as a disadvantage to its quick release, when so desired. Especially is this true, in the case of a crash where, due to the fact that the user may be rendered unconscious, the entire weight of the body is taken through the straps; or in emergency cases where the user finds it necessary, while in a dive or a loop, to bail out of the ship, the strain placed against the belt by the weight of the body is so great as to make it physically impossible to effect release of the buckle, due primarily to the faulty construction of the buckle. Thus when the user has greatest need for the belt to be quickly releasable, it is most ineffective for the purpose intended.

It is the primary object of this invention to provide a safety belt which is fitted with a quickly releasable buckle of such a character that it can be readily released under any and all circumstances with a minimum of physical effort, whereby the aforementioned objections and disadvantages may be obviated.

A further object of the present invention is to provide a quick release belt in which the buckle is locked or held positively in the latched position against accidental release by separable means which in no way hinders the quick releasing action of the belt, when so desired. In short, positive releasing action on the part of the user or another is required before the belt can be released.

The invention consists in the details of construction and in the combination and arrangement of the several parts whereby certain important advantages are attained and mainly comprises two separable members together with means for effectively holding the same against separation when in locking relation, all of which is hereinafter more particularly described and pointed out in the claims appended hereto.

In the accompanying drawing, Figure 1 is a top plan view of the belt embodying my invention.

Figure 2 is a side elevation of Figure 1.

Figure 3 is a sectional view taken on the line 3—3 of Figure 1.

Figure 4 is a sectional view taken on the line 4—4 of Figure 1.

Referring more particularly to the drawing wherein corresponding parts are designated by like numerals throughout the several views, the safety belt generally comprises two separable members 10 and 11, each member being suitably connected to the end portions of straps or other flexible members 12 and 13, in this instance, a safety belt of the type worn by aviators being illustrated.

In providing a safety belt for persons of this character, the belt must necessarily be sufficiently strong to withstand the weight of the person, and the catch or buckle which holds the ends of the belt together should be strong enough to support at least the weight of the person using the belt, and also must be capable of quick disengagement in case of an emergency.

To this end, the member 11, hereinafter to be referred to as the base member, is provided with a connecting bar 14 for receiving the loop end of the member 12. In like manner, the member 10, hereinafter to be referred to as the catch loop, is provided with a connecting bar 15 for receiving the looped end of the member 13.

The body portion 16 of the base member is substantially rectangular in shape so as to lie substantially flat against the body of the wearer and is formed at its forward end with a transversely arranged keeper bar 17 which is elevated above the body portion 16 an amount sufficient to provide an opening 18 adapted for receiving and guiding the tongue 19 formed on the forward end of the catch loop 11. The body portion 16 is suitably recessed, as indicated at 20, to receive the hook end of a latching element 21 that is pivoted to the body portion at 22. The hook end of the latching element is arcuate in formation, said arcuate portion centering upon the pivot 22 and projecting outwardly from the body portion of the base member.

The latching element merges into a release arm 23 rearwardly of the pivot 22, said arm being formed with oppositely disposed indents 24 in which spring actuated balls 25 are engaged when the hook end of the latching element is in latching relationship with the tongue of the catch loop 10.

The balls 25 heretofore mentioned, are backed up by coil springs 26 contained within suitable housings 27, the latter being secured in spaced relationship on either side of the longitudinal axis of the base body portion, to provide therebetween a recess for accommodation of the release handle. The forward open end of each housing 27 is peened over at the edges, as indicated at 28, to prevent loss of the locking balls when the arm 23 is moved to a releasing position.

When it is intended to latch the buckle, the tongue 19, formed on the catch loop 11, is first moved into registration with the hook end of the latching element, it being apparent that the keeper bar 17 serves not only to guide the tongue into such registry with the hook end of the latching element but also serves to prevent relative movement between the body of the base member and the tongue. The hook end of the latching element is thereafter moved into engagement with the tongue of the catch loop, the indents on the release arm 23 simultaneously moving into locking engagement with the balls 25 heretofore mentioned. By positioning the hook end of the latching element outwardly with respect to the body of the base member, an angular movement of approximately seventy degrees is necessary to permit of a quick disengagement of the parts, such disengagement being accomplished without effecting any relative movement of the ends of the strap members toward one another, tending to tighten the belt about the wearer's body during such disengaging movements.

From the foregoing description, it will be apparent that a buckle constructed in accordance with my invention, is particularly well adapted for use by aviators by reason of the convenience and facility with which it may be assembled and safely and quickly operated, and it will be obvious that my invention is susceptible of some change and modification without departing from the spirit thereof, and for this reason I do not wish to be understood as limiting myself to the precise arrangement and formation of the several parts herein shown in carrying out my invention in practice except as hereinafter claimed.

What I claim is:

1. In a safety belt, the combination of a two part flexible web, a catch loop attached to the end of one web part, and a pivotally mounted latching element attached to the end and rotatable in a plane normal to the plane of the other web part, said latching element including an end portion of hook-like formation with catch loop bearing surface equidistant from point of pivotation and cavity outwardly presented away from the external face of its joined web part in latched position and adapted to be movable from unlatched position into locking engagement with said catch loop upon movement of the latter into registry with said hook-like end portion, said locking movement being less than a ninety degree movement.

2. In a safety belt, the combination of a two part flexible web, a catch loop attached to the end of one web part, and a pivotally mounted latching element attached to the end and rotatable in a plane normal to the plane of the other web part and including an end portion of hook-like formation with catch loop bearing surface equidistant from point of pivotation and cavity outwardly presented away from the external face of its joined web part in latched position and when fully unlatched adapted to be received within said catch loop, said latching element being so constructed and arranged as to be engageable from said catch by an angular movement of said hook end less than ninety degrees inwardly toward said loop.

3. In a safety belt, the combination of a two part flexible web, a catch loop attached to the end of one web part, and a pivotally mounted latching element attached to the end and rotatable in a plane normal to the plane of the other web part and including an end portion of hook-like formation with catch loop bearing surface equidistant from point of pivotation and cavity outwardly presented away from the external face of its joined web part in latched position and when fully unlatched adapted to be received within said catch loop, said latching element being so constructed and arranged as to be engageable from said catch by an angular movement of said hook end less than ninety degrees inwardly toward said loop and means associated with said latching element for maintaining said element in latching relationship with respect to said catch loop.

4. In a safety belt, the combination of a two part flexible web, a base member attached to the end of the one web part, a latching element pivotally mounted on and rotatable in a plane normal to the outer face of said base member, said element having an end portion of hook-like formation with catch loop bearing surface equidistant from point of pivotation and merging into an arm beyond the base of said hook, and a catch loop attached to the end of the other web part, the hook cavity of said element in latched position being presented outwardly away from the outer face of said base member and being adapted when unlatched to be movable into latching engagement with said catch loop upon movement of the latter into registry with said hook-like end portion, said locking movement being materially less than a ninety degree movement.

5. In a safety belt, the combination of a two part flexible web, a catch loop attached to the end of one web part, a base member attached to the end of the other web part, a latching element pivotally mounted on and rotatable in a plane normal to the outer face of said base member and including an end portion of hook-like formation with hook cavity presented away from the outer face of said base member when in latched position and catch loop bearing surface thereof equidistant from point of pivotation, said element being further adapted to be movable from said latched position into latching engagement with said catch loop, and a keeper portion on said base member for guiding said catch loop into registry with said latching element and for restraining it against movement relative thereto.

6. In a safety belt, the combination of a two part flexible web, a catch loop attached to the end of one web part, a base member attached to the end of the other web part, a latching element pivotally mounted on and rotatable in a plane normal to the outer face of said base member and including an end portion of hook-like formation disposed forwardly of its pivot and merging into an arm rearwardly of said pivot, the hook cavity of said element in latched position being presented outwardly away from the outer face of said base member and being adapted when unlatched to be movable into latching engagement with said catch loop such that the loop engaging portion thereof continuously remains equidistant from point of pivotation and a keeper portion extending transversely of said base member for guiding said catch loop into registry with said latching element and for restraining it against movement relative thereto.

7. In a safety belt, the combination of a two part flexible web, a loop member attached to the end of one web part and having a catch tongue, a base member attached to the end of the other web part, a latching element pivotally mounted on and rotatable in a plane normal to the outer face of said base member and including a hook-like end portion of arcuate formation centering upon and disposed forwardly of the pivot of the latch, said latching element merging into a release arm rearwardly of its pivot, the hook cavity of said element in latched position being presented outwardly away from the outer face of said base member and being adapted when unlatched to be movable into latching engagement with said catch loop upon movement of the latter into registry with said hook-like end portion, and a keeper portion extending transversely of said base member and forming therewith a slot for guiding the catch tongue of said loop into registry with said hook end and for restraining said catch tongue against movement relative to said latching element.

8. In a safety belt, the combination of a two part flexible web, a loop member attached to the end of one web part and having a catch tongue, a base member attached to the end of the other web part, a latching element pivotally mounted on said base member and including a hook-like end portion of arcuate formation centering upon and disposed forwardly of the pivot of the latch, said latching element merging into a release arm rearwardly of its pivot, the hook end of said latching element presenting outwardly from said base member and adapted to be movable into latching engagement with said catch loop, upon movement of the latter into registry with said hook-like end portion, and a keeper portion extending transversely of said base member and forming therewith a slot for guiding the catch tongue of said loop into registry with said hook end and for restraining said catch tongue against movement relative to said latching element and means associated with the release arm for locking said latching element in latching relationship with said loop member.

9. In a safety belt, the combination of a two part flexible web, a loop member attached to the end of one web part and having a catch tongue, a base member attached to the end of the other web part, a latching element pivotally mounted on said base member and including a hook-like end portion of arcuate formation centering upon and disposed forwardly of the pivot of the latch, said latching element merging into a release arm rearwardly of its pivot, the hook end of said latching element presenting outwardly from said base member and adapted to be movable into latching engagement with said catch loop, upon movement of the latter into registry with said hook-like end portion, and a keeper portion extending transversely of said base member and forming therewith a slot for guiding the catch tongue of said loop into registry with said hook end and for restraining said catch tongue against movement relative to said latching element, and a spring controlled locking mechanism carried by said base member for locking said element against release from said loop member.

EDWARD L. HOFFMAN.